United States Patent [19]

Laufhütte

[11] Patent Number: 4,514,375
[45] Date of Patent: Apr. 30, 1985

[54] METHOD OF RECOVERING SULFUR FROM THE HYDROGEN SULFIDE CONTAINED IN COKE OVEN GASES

[75] Inventor: Dieter Laufhütte, Recklinghausen, Fed. Rep. of Germany

[73] Assignee: Firma Carl Still G.m.b.H. & Co. KG, Fed. Rep. of Germany

[21] Appl. No.: 472,495

[22] Filed: Mar. 7, 1983

[30] Foreign Application Priority Data

Mar. 18, 1982 [DE] Fed. Rep. of Germany ....... 3209858

[51] Int. Cl.$^3$ .......................... C01B 17/02; C01C 3/00
[52] U.S. Cl. .......................... 423/573 G; 423/573 R; 423/574 R; 423/576; 423/236; 423/237; 423/238
[58] Field of Search ........... 423/573 R, 573 G, 574 R, 423/574 L, 574 G, 576, 236, 237, 238, 351

[56] References Cited

U.S. PATENT DOCUMENTS

| | | | |
|---|---|---|---|
| 3,819,816 | 6/1974 | Wunderlich et al. | 423/238 |
| 3,822,337 | 7/1974 | Wunderlich et al. | 423/237 |
| 4,073,862 | 2/1978 | Haese | 423/236 |
| 4,075,310 | 2/1978 | Fischer | 423/238 |
| 4,101,642 | 7/1978 | Tippmer | 423/237 |
| 4,395,390 | 7/1983 | Desgrandchamps et al. | 423/237 |

Primary Examiner—Gregory A. Heller
Attorney, Agent, or Firm—McGlew and Tuttle

[57] ABSTRACT

Ammonia and hydrogen sulfide are washed out of the coke oven gas and stripped from the wash liquor in the form of gases and fumes or vapors. The ammonia is decomposed in a nickel catalyzer and a small part of the decomposition gases is supplied directly to a combustion furnace, while the larger part of the combustion gases is first cooled and freed from condensate, and only then supplied to the combustion furnace. In the combustion furnace, the proportion of $H_2S/SO_2$ needed for the Claus process is adjusted by a partial combustion of the decomposition gases. The gases from the combustion furnace are then processed in the Claus plant to sulfur.

2 Claims, 1 Drawing Figure

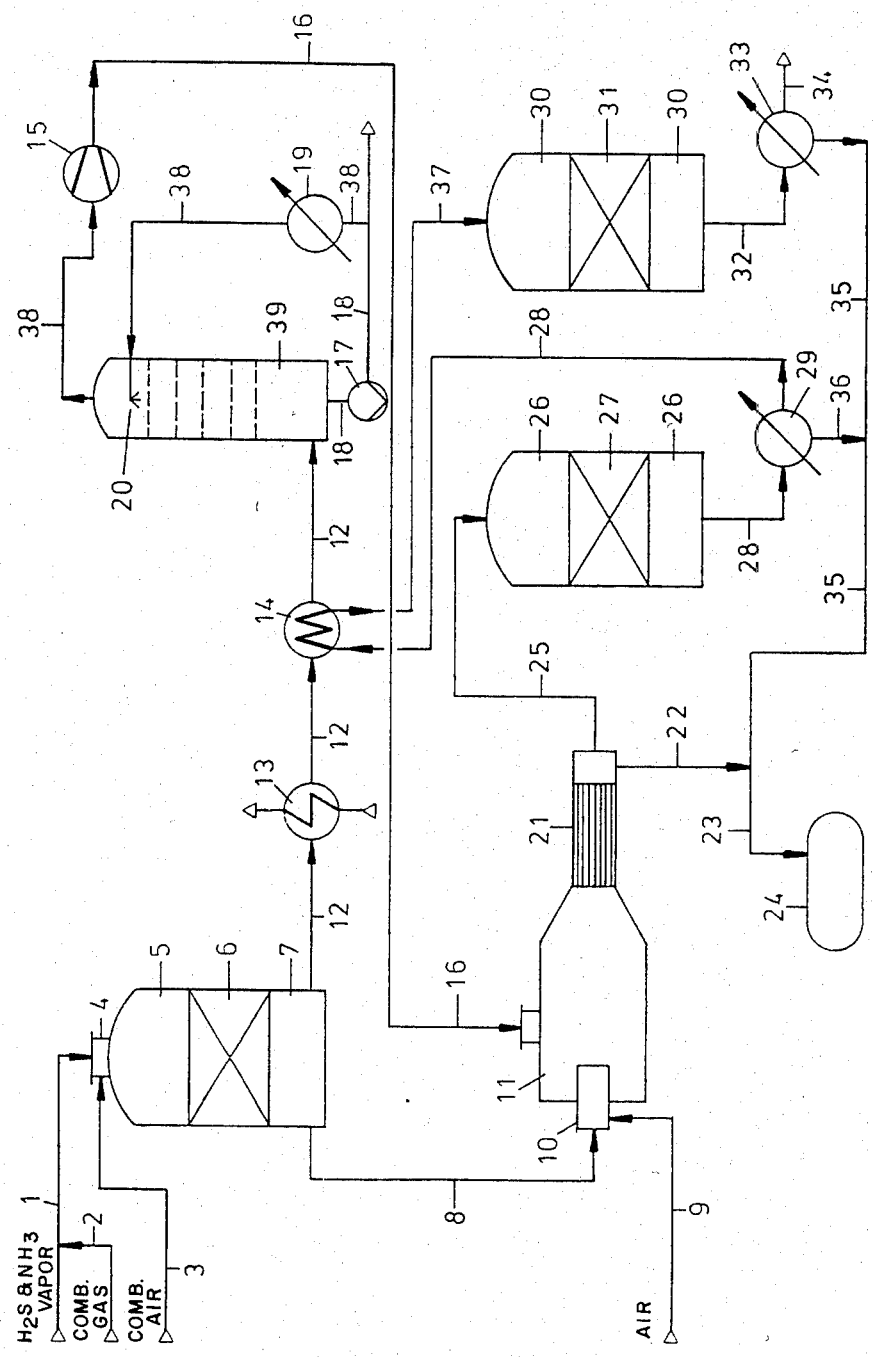

METHOD OF RECOVERING SULFUR FROM THE HYDROGEN SULFIDE CONTAINED IN COKE OVEN GASES

FIELD AND BACKGROUND OF THE INVENTION

This invention relates in general to the treatment of coke and in particular to a method of treating coke oven gases to recover sulfur from the hydrogen sulfide contained in the gases.

There are known methods providing concentrating the ammonia washed out of a coke oven gas in the so-called deacidizer vapors of a closed-circuit ammonia-hydrogen sulfide scrubber, burning the total amount of the deacidizer vapors, recuperating the heat of combustion in the form of high-pressure steam, removing the condensate, and recovering sulfur or sulfuric acid from the combustion gases. In these methods, the amount of combustion air to be admixed depends on whether the recovery of sulfur or sulfuric acid is sought (German Pat. Nos. 11 63 786; and 12 12 052).

These are non-catalytic methods of burning ammonia and their application in practice has shown that the function and operation of a plant of this kind becomes strongly disturbed if even small amounts of ammonia remain unburned or if other accompanying substances in the vapors, such as hydrocarbons, particularly aromatics, and hydrogen cycanide, do not burn down completely. This results in cloggings, particularly in the piping and the coolers, with the necessity of immediate cleaning of the plant, entailing costly manual labor. The economy of the plant operation is thereby unfavorably affected, since this always requires a shutdown.

Further known is a method of recovering sulfur from the hydrogen sulfide contained in coke oven gases, by partly combusting the hydrogen sulfide to sulfur dioxide and processing the gases in a Claus process to obtain sulfur while simultaneously burning the ammonia carried along, providing washing out of the ammonia and the hydrogen sulfide from the coke oven gas in a closed-circuit ammonia and hydrogen sulfide scrubber. Splitting the deacidizer vapors into substantially hydrogen sulfide free ammonia vapors and substantially ammonia-free hydrogen sulfide vapors, and combusting the ammonia and the hydrogen sulfide vapors each separately while adding firing or combustible gases if needed, wherein the ammonia combustion gases escaping from the waste heat boiler upon being cooled and freed from the aqueous condensate, are added to the partly combusted hydrogen sulfide vapors before their introduction into the Claus furnace (German Pat. No. 19 25 839).

In this method again, the above mentioned troubles have occurred, even though this is a catalytic process of ammonia decomposition and the cause of the troubles may rather be a strongly varying content in ammonia, hydrogen sulfide, hydrogen cyanide, and hydrocarbons of the initial vapors. Then, the addition of air amounts just adequate at the respective instant is difficult to control and it may be necessary to readjust it very soon, if the composition of the vapors changes. If a Claus plant is to operate with an optimum throughput, just one third of the hydrogen sulfide present in the gases to be processed must be oxidized to sulfur dioxide. Under any other oxidation conditions, allowances for losses in the sulfur recovery must be made, even with a formation of salts. This again raises difficulties and inconveniences in the combustion part of the plant, as well as in the Claus plant, wherefrom the waste gases then may fail to have an optimum content in noxious substances, particularly sulfur dioxide. Difficulties arise even in instances where prior to processing them, the vapors are split into hydrogen sulfide vapors with a low ammonia content, and ammonia vapors with a low hydrogen sulfide content, and this is due to the fact that with an irregular load, the splitting column cannot separate the gas stream exactly, so that from undecomposed ammonia and sulfur dioxide in the gas stream, solid ammonium sulfide forms and deposits in the piping and the apparatus. Such a risk is particularly high in this prior art method since after being cooled and separated from the aqueous condensate and prior to being introduced into the Claus furnace, the ammonia combustion gases are united with the partly burned hydrogen sulfide vapors.

SUMMARY OF THE INVENTION

The invention relates in general to a method of treating coke oven gases to recover sulfur from the hydrogen sulfide contained in the gases and using a Claus treating plant process. Vapors are washed from the coke oven gases which contain ammonia and hydrogen sulfide in a closed cycle water and ammonia scrubber, and these vapors are stripped of the wash liquors and concentrated. The inventive method comprises directing these vapors, with combustible gases into a first decomposition furnace for burning them therein. The gases are burned and directed through a nickel catalyzer to decompose the gases and the ammonia present therein. A small part of the decomposed gases is passed directly to a second furnace for burning therein and a larger part of the decomposed gases are first passed into a cooler to cool them and liberate the condensate and they are then directed into the second furnace. Partial combustion is carried out in the second furnace so as to regulate the proportion of hydrogen sulfide and sulfur dioxide needed for the Claus plant process. The partially combusted gases are then delivered to the Claus plant process in order to produce sulfur.

Accordingly it is an object of the invention to provide a method of treating coke oven gases in order to obtain sulfur.

A further object of the invention is to provide a method of treating coke oven gases to recover sulfur from the hydrogen sulfide contained in the gases using a Claus treating plant process which comprises directing the gases with combustible gases into a first decomposition furnace for burning therein and then through a nickel catalyzer to decompose the gases and the ammonia present therein, supplying a small part of the decomposed gases directly to a second furnace and burning them in the second furnace and a larger part larger than the smaller part of the decomposed gases into a cooler to cool them first and liberate the condensate therefrom and then passing them into the second furnace for burning therein and carrying out a partial combustion in the second furnace so as to regulate the proportion of the hydrogen sulfide in sulfur dioxide needed for the Claus plant process and delivering the partially combusted gases to the Claus plant process to obtain sulfur.

A further object of the invention is to provide a method of treating coke oven gases which is simple to carry out and inexpensive to operate.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE of the drawing is a schematic representation of a plan for carrying out the method of the invention.

GENERAL DESCRIPTION OF THE PREFERRED EMBODIMENT

Referring to the drawings in particular the invention embodied therein comprises a method of treating coke oven gases to recover sulfur from the hydrogen sulfide contained in the gases using a Claus treating plant which in the embodiment illustrated includes Claus plant members designated 26 and 30. In accordance with the method of the invention hydrogen sulfide and ammonia vapors of the coke oven gases are directed with a line 1 into a burner 4 along with combustible gas through a line 2 and combustion air through a line 3. The gases are burned in the first decombustion furnace 5 and then are passed through a nickel catalyzer 6 to decompose the gases and the ammonia present therein. A small part of the decomposed gases are directed through a line 8 to a burner 10 for burning in a second furnace 11. The large part larger than the small part of the decomposed gases is directed into a cooler 39 through a line 12 in order to cool the gas and to liberate condensate therefrom. Thereafter this larger part is ultimately directed into the second furnace 11 along with the small part and a partial combustion is carried out in the second furnace so as to regulate the proportion of hydrogen sulfide and sulfur dioxide need for the Claus process. The gases are then delivered to the Claus plant process first stage 26.

The figure shows supply line 1 through which the vapors carrying hydrogen sulfide and ammonia are directed to burner 4 of decomposition furnace 5 including a catalyzer bed 6 coated with a nickel catalyst (nickel on magnesite). A combustible gas is fed in through the line 2 and combustion air is supplied to burner 4 through line 3. The decomposed gases pass into a lower part 7 of decomposition furnace 5. Therefrom, about one third is directed through line 8 to burner 10 of furnace 11. Air to this burner is supplied through line 9. Through a line 16, about two thirds of the initial gas stream are fed into furnace 11, in the cooled state and free from condensate. The oxygen supply is adjusted to obtain a hydrogen sulfide to sulfur dioxide proportion of 2 to 1 in the gas stream leaving furnace 11. In a waste heat boiler 21, the gas stream is cooled, whereby a small amount of elementary sulfur is formed which is removed through lines 22 and 23 to a container 24. The cooled gas then passes through a line 25 into the first stage 26 of a Claus plant, which accommodates a catalyzer bed 27 comprising a catalyst on a bauxite substrate. The already partly converted gas stream as well as formed elementary sulfur pass from the first stage through a line 28 into a cooler 29, wherefrom elementary sulfur is removed through lines 36, 35 and 23 again into container 24. The cooled gas stream passes through a line 28 into a heat exchanger 14 where it is reheated and then directed through a line 37 into the second stage 30 of the Claus plant equipped with a catalyzer bed 31. Elementary liquid sulfur and the gas stream are cooled in a cooler 33 and the gas is removed through a line 34, while the elementary sulfur is again directed through lines 35 and 23 into container 24.

About two thirds of the gas stream are discharged from lower part 7 of decomposition furnace 4, 5, 6 of the first stage through a line 12. The gas is then cooled in a cooler 13, gives off further heat to the process gas stream in heat exchanger 14 and passes to a cooler 39 where it is freed from condensate. The condensate is drained through a line 18 and a container 17. A portion of the condensate is recycled to cooler 39 through a line 38, a cooler 19, and a distributor 20. The cooled gas stream free from condensate escapes through a line 38 and is compressed in a compressor 15 and directed into furnace 11 through line 16.

In accordance with the method of the invention for recovering sulfur from the hydrogen sulfide contained in coke oven gases the hydrogen sulfide is partially burned to sulfur dioxide which is then processed to sulfur in a Claus process with a simultaneous combustion of the carried along ammonia. In the process of the method of the invention ammonia and hydrogen sulfide are washed out of the coke oven gas in the closed cycle water and ammonia scrubber and the substances are stripped off the wash liquors and concentrated in stripped vapors. The vapors are then heated to decomposition temperature of ammonia by admixing and burning a combustible gas. The ammonia is decomposed catalytically into nitrogen and hydrogen and the hydrogen is burned together with a part of the hydrogen sulfide while forming sulfur dioxide. The total amount of the combustion gases are cooled and upon removing the condensed water are processed to sulfur. The process is characterized by the fact that the strip vapors are rich in ammonia and hydrogen sulfide and contain hydrogen cyanide and hydrocarbons and they are heated to a temperature range of between 1000° to 1200° C. by admixing a combustible gas and an adequate amount of air and burning the mixture. The gases pass while they are at this high temperature through a nickel catalyst where the ammonia is decomposed to nitrogen and hydrogen but the hydrogen sulfide is not affected. The hot gas stream is then split and directed with only a small part thereof to a combustion furnace with a further supply of air. The hydrogen is burned to water and the hydrogen sulfide is partly burned to sulfur dioxide. The larger part of the split stream is cooled and condensed water is removed therefrom. The hydrogen sulfide containing ammonia-free water-free gases is directed into the second combustion chamber where they are united again with the smaller part of the initially split gas stream. In the second combustion furnace air is added in an amount that the gas stream leaving the combustion furnace contains hydrogen sulfide and sulfide dioxide in a proportion of 2 to 1. The gas stream is then cooled to 200° to 250° C. and supplied to the Claus plant where the sulfur components are processed to elementary sulfur.

While a specific embodiment of the invention has been shown and described in detail to illustrate the application of the principles of the invention, it will be understood that the invention may be embodied otherwise without departing from such principles.

What is claimed is:

1. A method of treating hydrogen sulfide and ammonia vapors that are stripped from coke oven gases having hydrogen sulfide and ammonia therein, to recover sulfur from the hydrogen sulfide contained in the gases under a Claus treating plant process, comprising:

washing ammonia and hydrogen sulfide out of the coke oven gases in a closed cycle water and ammonia scrubber to form a raw vapor and stripping the raw vapor of wash liquors and concentrating the stripped raw vapor to form the hydrogen sulfide and ammonia vapors to be treated, the hydrogen sulfide and ammonia vapors containing hydrogen cyanide and hydrocarbon;

directing the vapors (1) along with combustion (2) and oxidation (3) gases, into a first combustion furnace (5) and buring them therein to form a burned vapor including ammonia and hydrogen sulfide, sufficient combustion and oxidation gases being directed with the hydrogen sulfide and ammonia vapors in the first combustion furnace to burn the vapors and raise their temperature to a range between 1000° and 1200° C.;

directing the burned vapor through a nickel catalyzer (6) to decompose the burned vapor and the ammonia present therein to form decomposed gases, the burned vapor being supplied to the nickel catalyzer at the temperature range of 1000° to 1200° C., hydrogen sulfide in the burned vapor being uneffected in the nickel catalyzer;

supplying about one-third of the decomposed gases (8) directly to a burner (10) of a second furnace (11) for burning;

supplying a remaining two-thirds of the decomposed gases (12) into a cooler (39) to cool them and to liberate condensate therefrom to form liberated gases;

directing the liberated gases (16) into the second furnace (11) to form at least some sulfur dioxide;

adding air (9) to the burner (10) in an amount to partly combust the liberated gases with the relative one-third and two-thirds amounts of decomposed gases being selected to regulate a proportion of the hydrogen sulfide to sulfur dioxide needed for the Claus plant process to be 2 to 1;

cooling the gases from the second furnace which are partially combusted to 200° to 250° C.; and delivering gases from the second furnace which are partially combusted and cooled, to the Claus plant process to obtain sulfur.

2. A method according to claim 1, wherein the Claus plant process includes a first stage for receiving the gases which are partially combusted, and a second stage for receiving gases from the first stage, including heating gases from the first stage of the Claus plant process before they are supplied to the second stage of the Claus plant process by using latent heat from the decomposed gases.

* * * * *